US011859776B1

(12) United States Patent
Qin

(10) Patent No.: US 11,859,776 B1
(45) Date of Patent: Jan. 2, 2024

(54) LIGHT BUST AND LIGHT STRIP

(71) Applicant: ACE SMART&TECH (NINGBO) CO., LTD., Ningbo (CN)

(72) Inventor: Yanbei Qin, Ningbo (CN)

(73) Assignee: ACE SMART & TECH(NINGBO) CO., LTD., Ningbo (CN)

( * ) Notice: Subject to any disclaimer, the term of this patent is extended or adjusted under 35 U.S.C. 154(b) by 0 days.

(21) Appl. No.: 17/815,107

(22) Filed: Jul. 26, 2022

(30) Foreign Application Priority Data

May 30, 2022 (CN) ......................... 202221332725.7

(51) Int. Cl.
*F21S 4/20* (2016.01)
*F21K 9/232* (2016.01)
*F21V 17/16* (2006.01)
*F21V 23/06* (2006.01)

(52) U.S. Cl.
CPC ................ *F21K 9/232* (2016.08); *F21S 4/20* (2016.01); *F21V 17/16* (2013.01); *F21V 23/06* (2013.01)

(58) Field of Classification Search
CPC .. F21K 9/232; F21S 4/20; F21V 17/16; F21V 23/06
See application file for complete search history.

(56) References Cited

U.S. PATENT DOCUMENTS 4,514,791 A * 4/1985 Tokieda .................... F21S 4/20 439/699.2
9,958,757 B2 * 5/2018 Turk ..................... F21V 21/005
2005/0170688 A1 * 8/2005 Chen ...................... H01R 24/22 439/502
2009/0207617 A1 * 8/2009 Merchant .............. F21S 41/192 362/294
2009/0269951 A1 * 10/2009 Scheele .................. H05K 7/026 439/76.2
2011/0136394 A1 * 6/2011 Mostoller ............ H01R 4/2433 439/701
2019/0032887 A1 * 1/2019 Joerg ...................... F21K 9/233
2019/0274206 A1 * 9/2019 Altamura .............. F21V 23/003

FOREIGN PATENT DOCUMENTS

CN 205372183 U 7/2016
CN 107289343 A 10/2017
CN 114321786 A 4/2022
CN 114321849 A 4/2022

* cited by examiner

*Primary Examiner* — Evan P Dzierzynski
(74) *Attorney, Agent, or Firm* — INNOVATION CAPITAL LAW GROUP, LLP; Vic Lin

(57) ABSTRACT

A light bulb, comprising: a circuit board, provided with a light-emitting unit, two first wiring parts and at least two second wiring parts, wherein one of the first wiring parts and one of the second wiring parts are both connected to a positive terminal of the light-emitting unit, and the other first wiring part and the other second wiring part are both connected to a negative terminal of the light-emitting unit; and a fixing member connected to the circuit board, the fixing member being capable of fixing wires to the first wiring parts and the second wiring parts.

19 Claims, 16 Drawing Sheets

LIGHT BULB AND LIGHT STRIP

BACKGROUND OF THE INVENTION

1. Technical Field

The present invention belongs to the technical field of light-emitting components, relates to a light bulb, and further relates to a light strip.

2. Description of Related Art

At present, light-emitting elements such as LED lights are widely used in various occasions such as landscape lighting, indoor lighting, and commercial lighting due to their advantages of energy saving and environmental friendliness. Due to the limited lighting effect of a single light bulb, it is required to assemble several light bulbs to form a light strip.

In the prior art, light bulbs are generally assembled together by means of fixed connection such as welding to form a complete light strip and the light bulbs cannot be dismantled and replaced according to the user's needs once produced. In addition, since the light strip has a large overall size, there is a large room for improvement.

BRIEF SUMMARY OF THE INVENTION

In view of the above problems of the prior art, an objective of the present invention is to provide a light bulb and a light strip.

The objective of the present invention can be achieved through the following technical solutions: a light bulb comprises:

A circuit board provided with a light-emitting unit, two first wiring parts and at least two second wiring parts, wherein one of the first wiring parts and one of the second wiring parts are both connected to a positive terminal of the light-emitting unit, and the other first wiring part and the other second wiring part are both connected to a negative terminal of the light-emitting unit; and A fixing member connected to the circuit board, the fixing member being capable of fixing wires to the first wiring parts and the second wiring parts.

In the above-mentioned light bulb, the fixing member is configured as a fixing plate. The fixing plate is detachably connected to the circuit board. The fixing plate is provided with wiring terminals and the number of wiring terminals is the same as the sum of the number of first wiring parts and the number of second wiring parts. The wiring terminals are in one-to-one correspondence with the first wiring parts and the second wiring parts. When the fixing plate is connected to the circuit board, the wiring terminals crimp the wires on the first wiring parts and the second wiring parts.

In the light bulb, the first wiring parts and the second wiring parts are both configured as guide holes, and the wiring terminals are slidably connected to the guide holes.

In the light bulb, each wiring terminal is provided with a threading hole. The wiring terminals are arranged on a front side of the fixing plate, and the wires extend from a back side of the fixing plate through the threading holes to the front side of the fixing plate.

In the light bulb, the fixing member is configured as elastic sheets, ends of the elastic sheets are fixedly connected to the circuit board, and the number of elastic sheets is the same as the sum of the number of first wiring parts and the number of second wiring parts. The elastic sheets are in one-to-one correspondence with the first wiring parts and the second wiring parts. The elastic sheets crimp the wires on the first wiring parts and the second wiring parts.

In the light bulb, the fixing member is configured as a clip, and the clip is detachably connected to the circuit board. When connected to the circuit board, the clip crimps the wires on the first wiring parts and/or the second wiring parts.

In the light bulb, a housing is further included. The housing has a receiving cavity and a wiring port. The wiring port is connected to the receiving cavity. Both the circuit board and the fixing member are arranged in the receiving cavity. The light emitted by the light-emitting element passes through the housing.

In the light bulb, the housing includes a first shell and a second shell, and the first shell is detachably connected to the second shell and is assembled with the second shell to form the housing.

In the light bulb, the first shell is provided with a protruding portion, the second shell is provided with a recessed portion adapted to the protruding portion, and the first shell and the second shell are engaged through the protruding portion and the recessed portion.

In the light bulb, the first shell is further provided with a positioning hole, the second shell is further provided with a positioning pin adapted to the positioning hole, and through the positioning hole, the first shell is able to guide the positioning pin of the second shell to move.

In the light bulb, the receiving cavity is provided with a limiting stand, and the circuit board and the fixing plate are limited in the limiting stand and are exposed out of the light-emitting unit.

In the light bulb, a wiring block is further included. The wiring block is detachably connected to the housing, and the wiring port is covered when the wiring block is connected to the housing.

In the light bulb, the end of the housing, which is of a cylindrical structure, is provided with unlocking grooves in its axial direction and locking grooves in its circumferential direction. The unlocking grooves are communicated with the locking grooves. The wiring block is provided with connecting blocks. The connecting blocks are able to move axially along the unlocking grooves at the end of the housing and are able to move circumferentially along the locking grooves at the end of the housing. When located in the locking grooves, the connecting blocks are limited by the locking grooves to move axially at the end of the housing.

In the light bulb, each locking groove is provided with a snap-on recess, and each connecting block is provided with a snap-on protrusion. When the connecting blocks move along the locking grooves and the snap-on protrusions are aligned with the snap-on recesses, the connecting blocks are engaged with the snap-on recesses of the locking grooves through the snap-on protrusions.

In the light bulb, two unlocking grooves, two locking grooves and two connecting blocks are provided. The two unlocking grooves are arranged symmetrically, the two locking grooves are arranged symmetrically, and the two connecting blocks are arranged symmetrically. In the light bulb, the wiring block is provided with positioning grooves. The side wall of each locking groove is provided with a one-way slope. The connecting blocks can move from the unlocking grooves to the adjacent locking grooves through the one-way slopes.

In the light bulb, the wiring block is provided with positioning grooves, and the housing is provided with positioning blocks. When the connecting blocks move along the locking grooves and the positioning blocks are aligned with the positioning grooves, the housing is engaged with the positioning grooves of the wiring block through the positioning blocks.

In the light bulb, two positioning grooves and two positioning blocks are provided. The two positioning grooves are arranged symmetrically, and the two positioning blocks are arranged symmetrically.

In the light bulb, the wiring block is provided with a line distribution hole.

Further provided is a light strip, including the light bulb and further including a power supply, wherein at least one light bulb is provided, the light bulbs are electrically connected in sequence, the two first wiring parts of one of the light bulbs are connected to positive and negative poles of the power supply, and the two first wiring parts of the next light bulb are respectively electrically connected to the two second wiring parts of the former light bulb.

Compared with the prior art, the beneficial effects of the invention are as follows.

1. When the two first wiring parts are powered on and the two second wiring parts form a loop together with an external circuit, the light-emitting unit and the external circuit are connected in parallel. Wires can be fixed to the first wiring parts and the second wiring parts by the fixing member, without additional welding and fixing, and the wires can be connected and fixed according to requirements. So it is very flexible to use.

2. By arranging the entire fixing plate close to the circuit board, the wires can be crimped on the first wiring part and the second wiring part by corresponding wiring terminals at one time.

3. The circuit board can crimp the wires passing through the guide holes to the first wiring parts and the second wiring parts, so the wires can be fixed to the first wiring parts and the second wiring parts by sliding along the wiring terminals through the guide holes.

4. The wires can extend from the back side of the fixing plate through the threading holes to the front side of the fixing plate, so that the wires originally located under the fixing plate can be led to the position above the fixing plate through the threading holes.

5. One end of the elastic sheet is fixedly connected to the circuit board, and the other end of the elastic sheet can move on the circuit board. When the wires are inserted into gaps between the elastic sheets and the first wiring parts or the second wiring parts, the elastic sheets can crimp the wires on the first wiring parts or the second wiring parts.

6. The clip is provided with a slot, and the clip is inserted into the circuit board through the slot. When the clip is used to clamp the wires at the first wiring parts or the second wiring parts, the wires are crimped on the first wiring parts or the second wiring parts.

Figure 1:
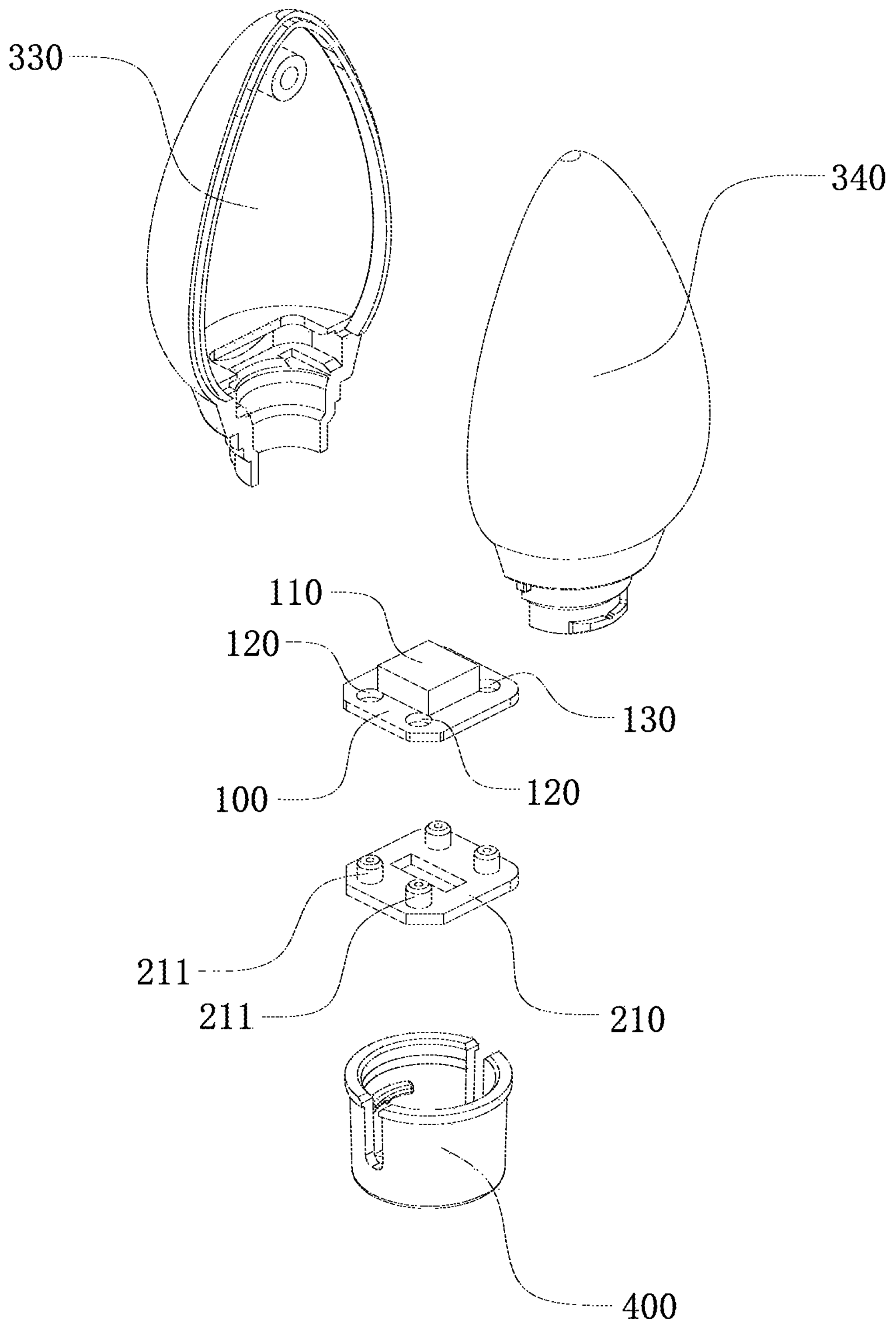
FIG. 1 is an exploded view of a light bulb according to the present invention.

In the figures, 100, circuit board; 110, light-emitting unit; 120, first wiring part; 130, second wiring part; 210, fixing plate; 211, wiring terminal; 212, threading hole; 220, elastic sheet; 230, clip; 300, housing; 310, receiving cavity; 311, limiting stand; 320, wiring port; 330, first shell; 331, protruding portion; 332, positioning hole; 340, second shell; 341, recessed portion; 342, positioning pin; 350, unlocking groove; 360, locking groove; 361, snap-on recess; 362, one-way slope; 370, positioning block; 400, wiring block; 410, connecting block; 411, snap-on protrusion; 420, positioning groove; 430, line distribution hole.

DETAILED DESCRIPTION OF THE INVENTION

The following are specific embodiments of the present invention and further describe the technical solutions of the present invention in conjunction with the accompanying drawings, but the present invention is not limited to these embodiments.

It should be noted that all directional indications (such as up, down, left, right, front and back) in the embodiments of the present invention are only used to explain a relative positional relationship, motion, etc. between the various components in a specific attitude (as shown in the accompanying drawings). If the specific attitude changes, the directional indications will also change accordingly.

In addition, descriptions such as “first”, “second”, “one”, etc. in the present invention are only used for description purposes, and should not be construed as indicating or implying a relative importance or implicitly indicating the number of technical features indicated. Thus, features defined by the term “first” or “second” may include at least one of the features, either explicitly or implicitly. In the description of the present invention, “a plurality of” means at least two, such as two, three, etc., unless otherwise expressly and specifically defined.

In the present invention, unless otherwise expressly specified and defined, the terms “connected”, “fixed” and the like should be understood in a broad sense. For example, the connection may be either a fixed connection or a detachable connection, or in one piece; it may be a mechanical connection, or it may be an electrical connection; it may be a direct connection or indirect connection through an intermediate medium, and may be an internal communication of two components or an interaction relationship between two components, unless otherwise expressly defined. For those skilled in the art, the specific meanings of the above terms in the present disclosure could be understood according to the specific conditions.

In addition, the technical solutions of the various embodiments of the present invention can be combined with each other, but must be based on the implementation by those of ordinary skill in the art. When the combinations of technical solutions contradict each other or cannot be implemented, it should be considered that such combination of technical solutions does not exist and does not fall within the scope of the present invention.

The specific embodiments described herein are only examples to illustrate the spirit of the present invention. Those skilled in the art to which the present invention belongs can make various modifications or additions to the specific embodiments described or use similar alternatives, without departing from the spirit of the present invention or going beyond the scope defined in the appended claims.

As shown in FIG. 1 to FIG. 16, a light bulb includes: a circuit board 100 and a fixing member.

The circuit board 100 is provided with a light-emitting unit 110, two first wiring parts 120 and at least two second wiring parts 130. One of the first wiring parts 120 and one of the second wiring parts 130 are both connected to a positive terminal of the light-emitting unit 110, and the other first wiring part 120 and the other second wiring part 130 are both connected to a negative terminal of the light-emitting unit 110.

Specifically, the two first wiring parts 120 are respectively configured to be electrically connected to the positive and negative poles of a power supply or with the two second wiring parts 130 of other light bulbs. At least two second wiring parts 130 are provided. As other implementations, two or four or six second wiring parts 130 may also be provided. The second wiring parts 130 are identical in shape and structure with the first wiring parts 120.

Figure 4:
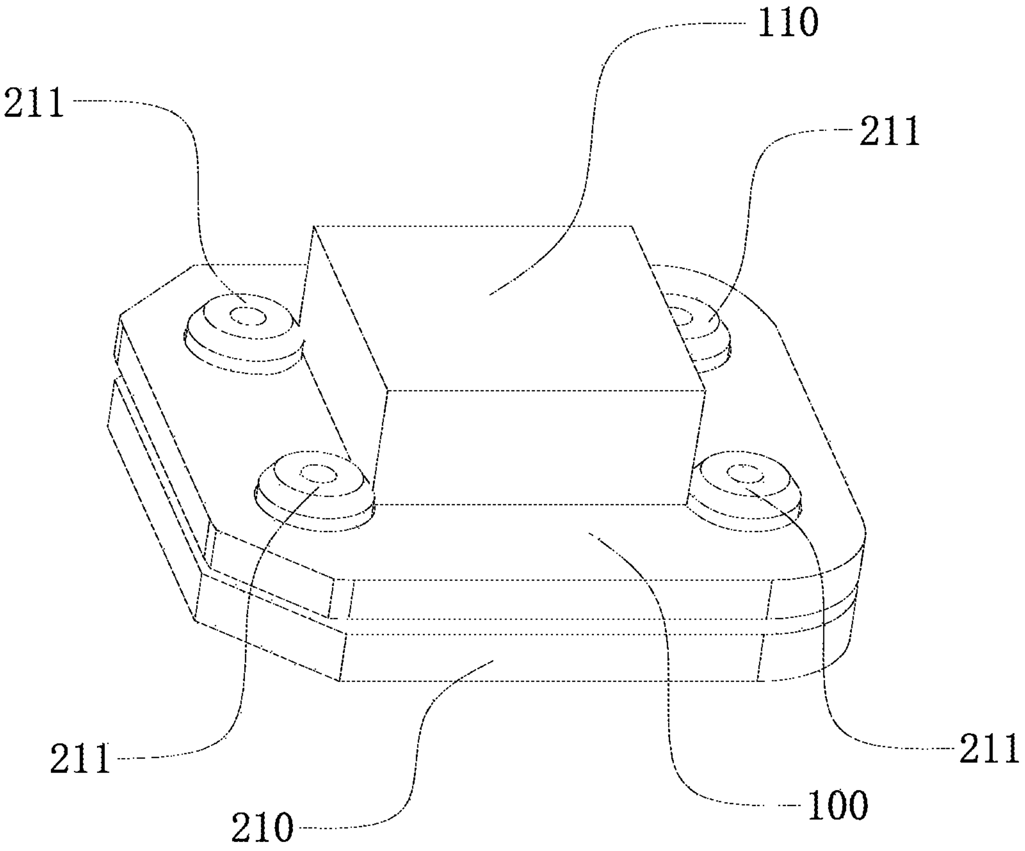
FIG. 4 is a schematic structural diagram of a fixing plate and a circuit board according to the present invention.
Figure 5:
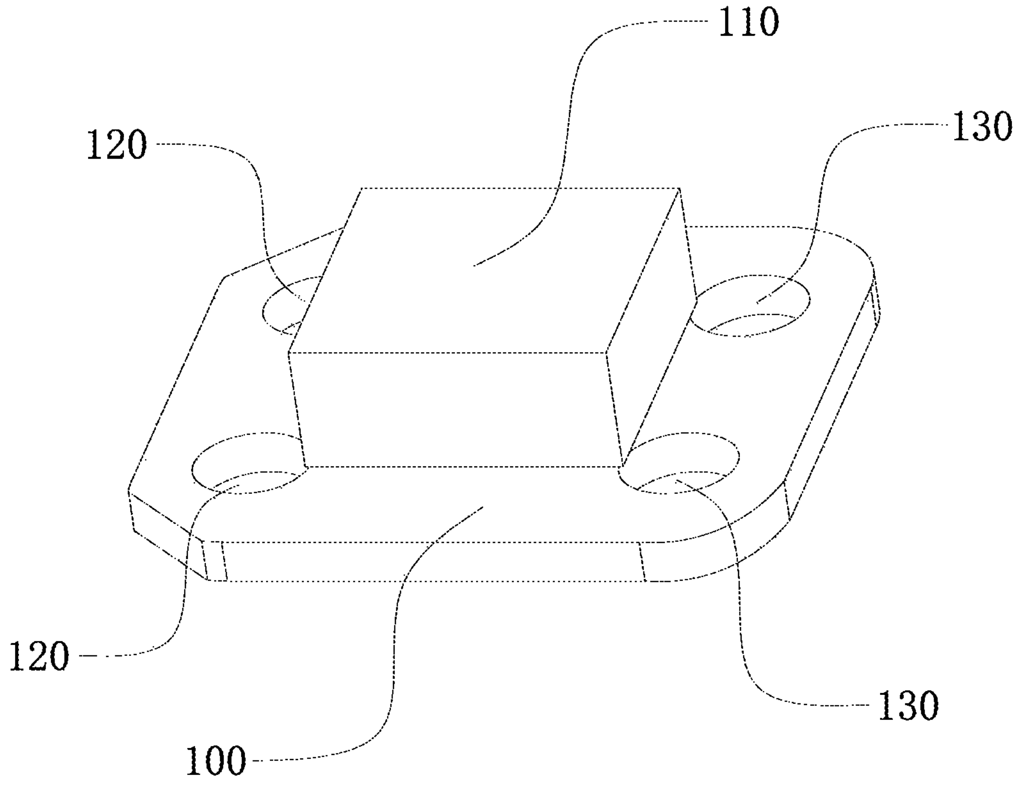
FIG. 5 is a schematic structural diagram of the circuit board according to the present invention.
Figure 6:
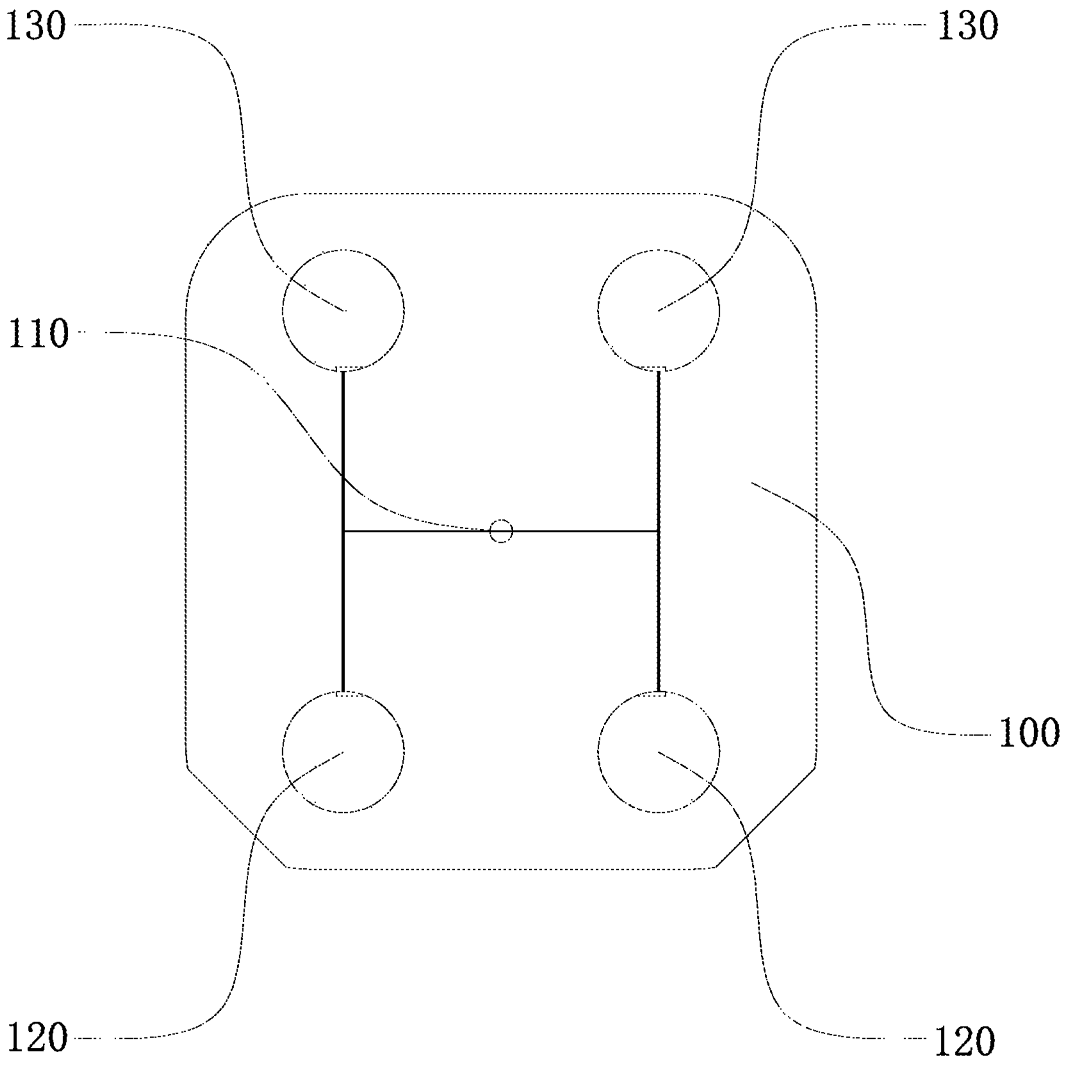
FIG. 6 is a circuit connection diagram of the circuit board according to the present invention.
Figure 8:
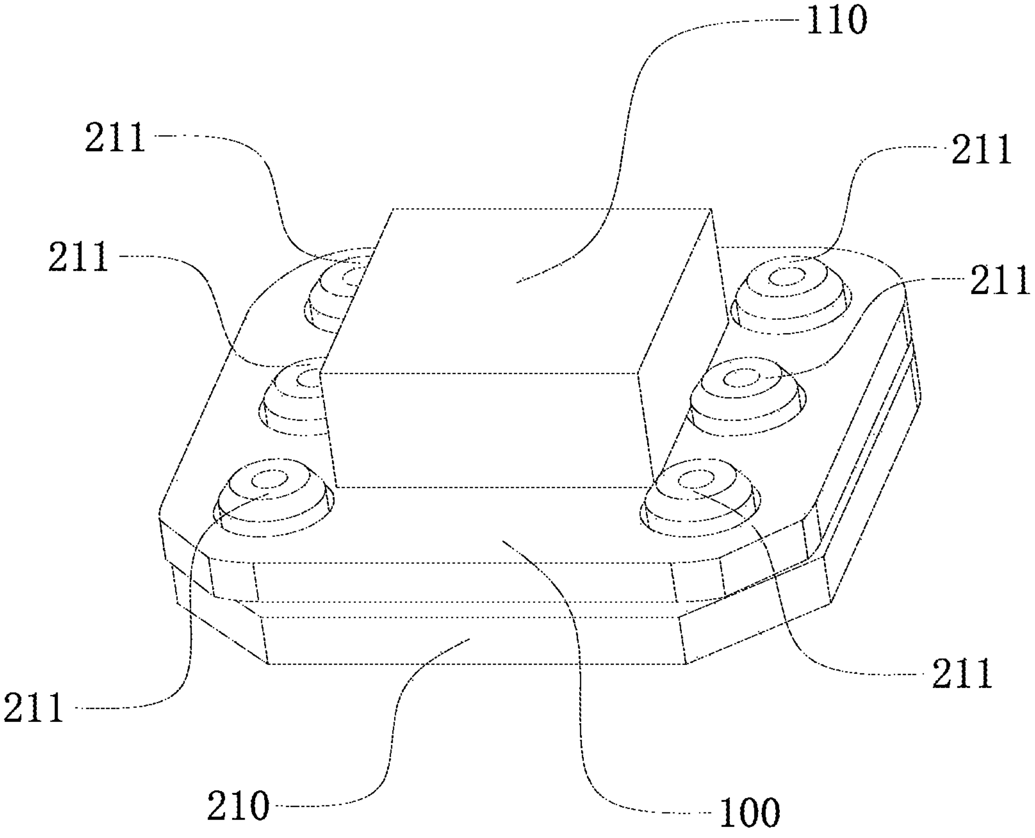
FIG. 8 is a schematic structural diagram of another fixing plate and the circuit board according to the present invention.

Specifically, as shown in FIG. 4, the circuit board 100 may be provided with two first wiring parts 120 and two second wiring parts 130; or as shown in FIG. 8, the circuit board 100 may be provided with two first wiring parts 120 and four second wiring parts 130; or more second wiring parts 130 may be provided.

The fixing member is connected to the circuit board 100. The fixing member is capable of fixing wires to the first wiring parts 120 and the second wiring parts 130.

In this embodiment, when the two first wiring parts 120 are powered on and the two second wiring parts 130 form a loop together with an external circuit, the light-emitting unit 110 and the external circuit are connected in parallel. Wires can be fixed to the first wiring parts 120 and the second wiring parts 130 by the fixing member, without additional welding and fixing, and the wires can be connected and fixed according to requirements. So it is very flexible to use.

As shown in FIGS. 4, 5, 6 and 7, on the basis of the above embodiment, the fixing member is configured as a fixing plate 210. The fixing plate 210 is detachably connected to the circuit board 100. The fixing plate 210 is provided with wiring terminals 211 and the number of wiring terminals 211 is the same as the sum of the number of first wiring parts 120 and the number of second wiring parts 130. The wiring terminals 211 are in one-to-one correspondence with the first wiring parts 120 and the second wiring parts 130. When the fixing plate 210 is connected to the circuit board 100, the wiring terminals 211 can crimp the wires on the first wiring parts 120 and the second wiring parts 130.

In this embodiment, by arranging the entire fixing plate 210 close to the circuit board 100, the wires can be crimped on the first wiring parts 120 and the second wiring parts 130 by corresponding wiring terminals 211 at one time.

As shown in FIGS. 4, 5, 6 and 7, on the basis of the above embodiment, both the first wiring parts 120 and the second wiring parts 130 are configured as guide holes, and the wiring terminals 211 are slidably connected to the guide holes.

In this embodiment, the circuit board 100 can crimp the wires passing through the guide holes to the first wiring parts 120 and the second wiring parts 130, so that the wires can be fixed to the first wiring parts 120 and the second wiring parts 130 by sliding along the wiring terminals 211 through the guide holes.

Figure 7:
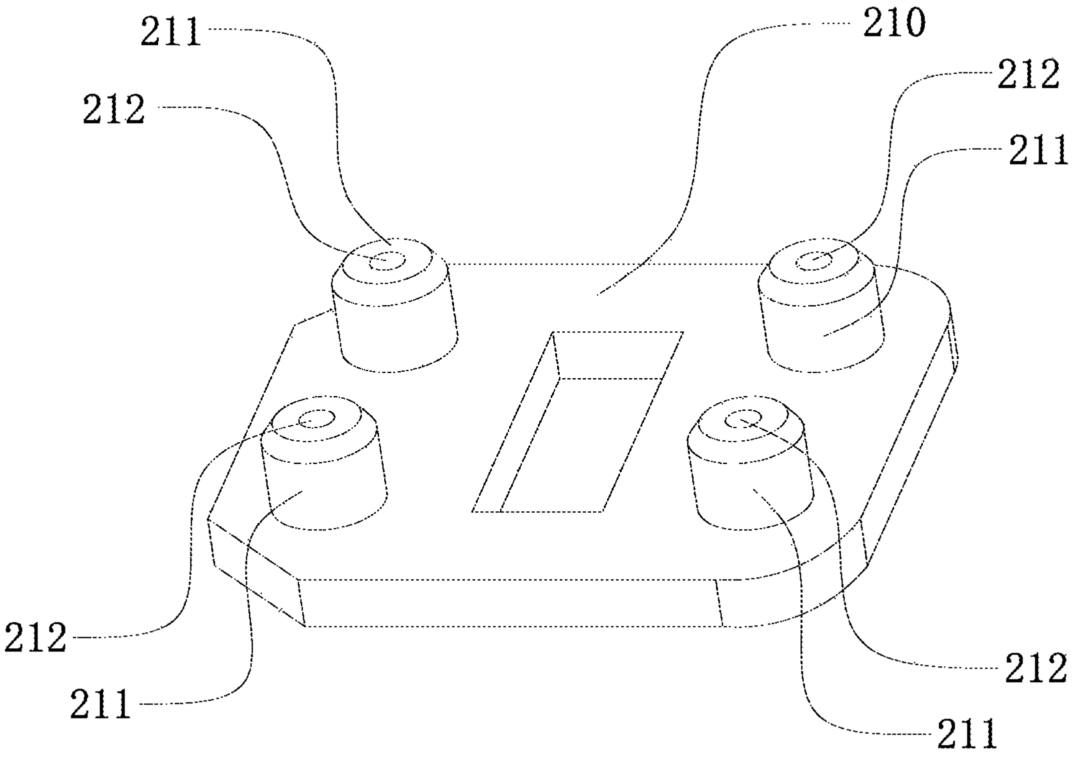
FIG. 7 is a schematic structural diagram of the fixing plate according to the present invention.

As shown in FIGS. 4, 7, and 8, on the basis of the above embodiment, each wiring terminal 211 is provided with a threading hole 212. The wiring terminals 211 are arranged on a front side of the fixing plate 210, and the wires can extend from a back side of the fixing plate 210 through the threading holes 212 to the front side of the fixing plate 210.

In this embodiment, the wires can extend from the back side of the fixing plate 210 through the threading holes 212 to the front side of the fixing plate 210, so that the wires originally located under the fixing plate 210 can be led to the position above the fixing plate 210 through the threading holes 212.

Figure 9:
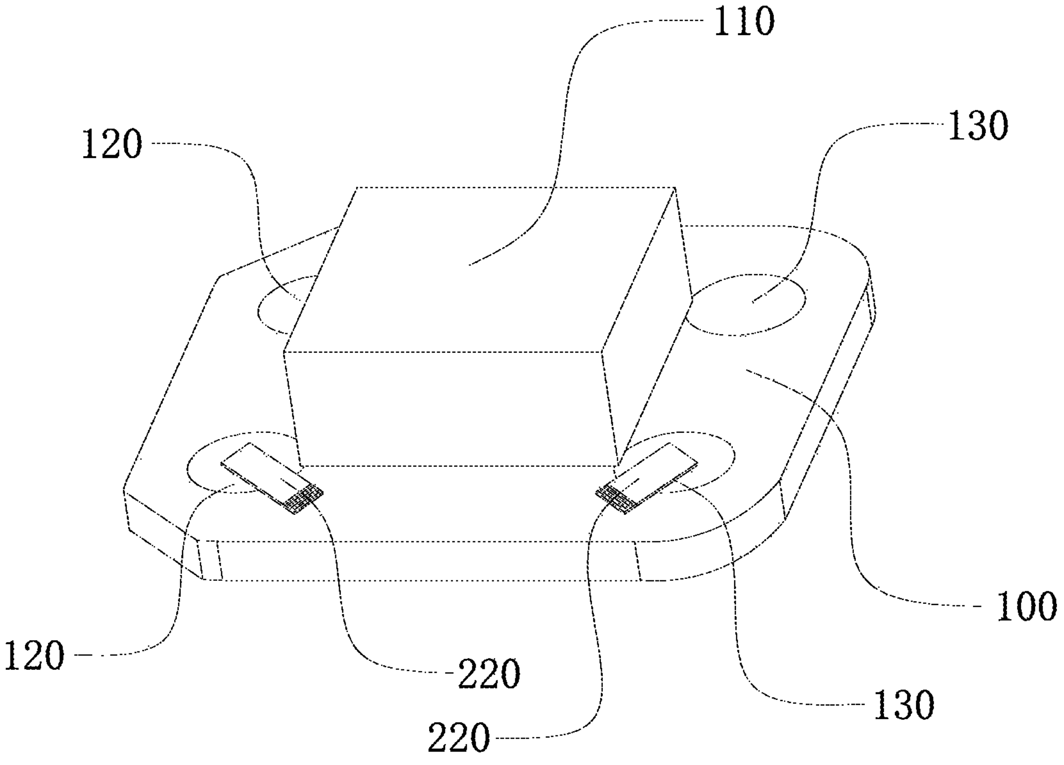
FIG. 9 is a schematic structural diagram of the circuit board and elastic sheets according to the present invention.

As shown in FIG. 9, on the basis of the above embodiment, the fixing member is configured as elastic sheets 220, ends of the elastic sheets 220 are fixedly connected to the circuit board 100, and the number of elastic sheets 220 is the same as the sum of the number of first wiring parts 120 and the number of second wiring parts 130. The elastic sheets 220 are in one-to-one correspondence with the first wiring parts 120 and the second wiring parts 130. The elastic sheets 220 can crimp the wires on the first wiring parts 120 and the second wiring parts 130.

In this embodiment, one end of the elastic sheet 220 is fixedly connected to the circuit board 100, and the other end of the elastic sheet 220 can move on the circuit board 100. When the wires are inserted into gap between the elastic sheets 220 and the first wiring parts 120 or the second wiring parts 130, the elastic sheets 220 can crimp the wires on the first wiring parts 120 or the second wiring parts 130.

Figure 10:
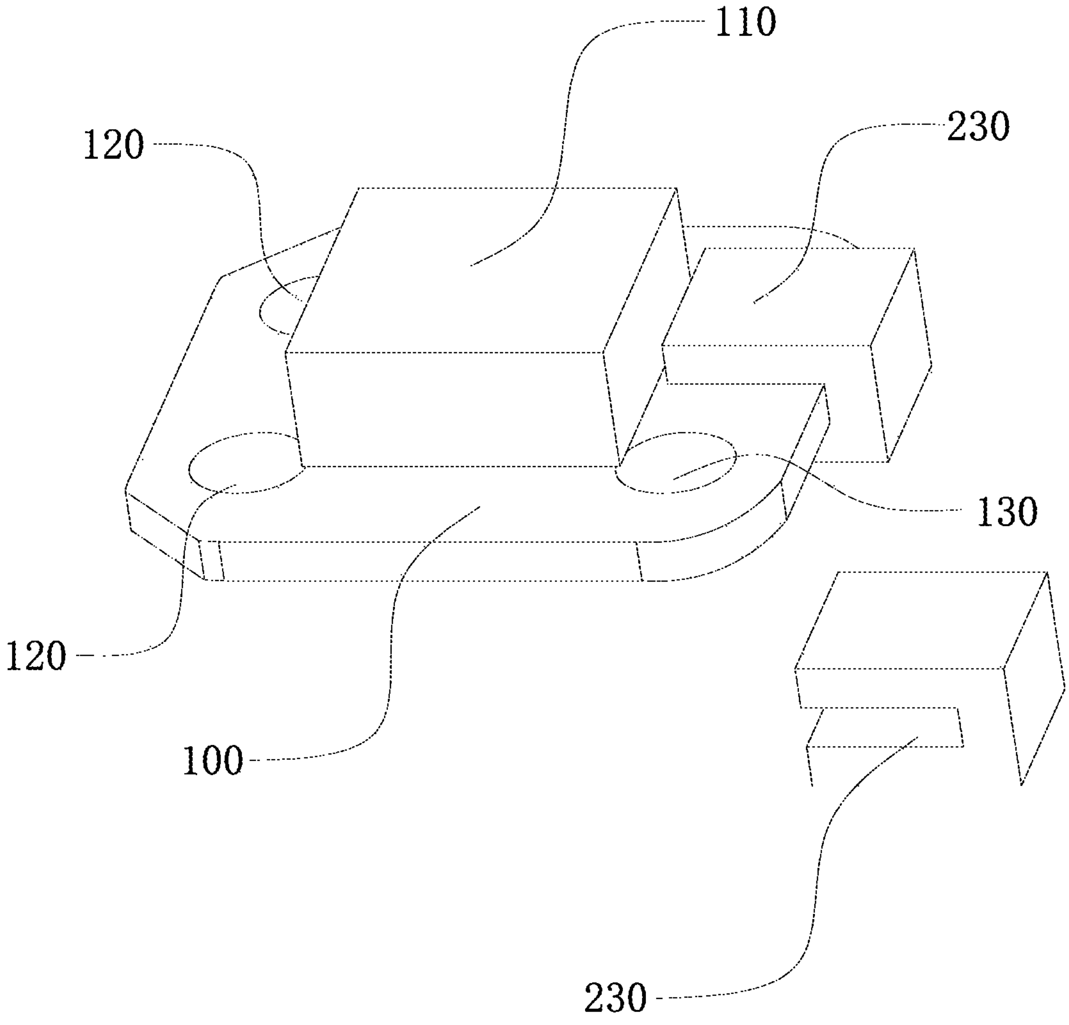
FIG. 10 is a schematic structural diagram of the circuit board and a clip according to the present invention.

As shown in FIG. 10, on the basis of the above embodiment, the fixing member is configured as a clip 230, and the clip 230 is detachably connected to the circuit board 100. When the clip 230 is connected to the circuit board 100, the clip 230 can crimp the wires on the first wiring parts 120 and/or the second wiring parts 130.

In this embodiment, the clip 230 is provided with a slot, and the clip 230 is inserted into the circuit board 100 through the slot. When the clip 230 is used to clamp the wires at the first wiring parts 120 or the second wiring parts 130, the wires are crimped on the first wiring parts 120 or the second wiring parts 130.

Figure 3:
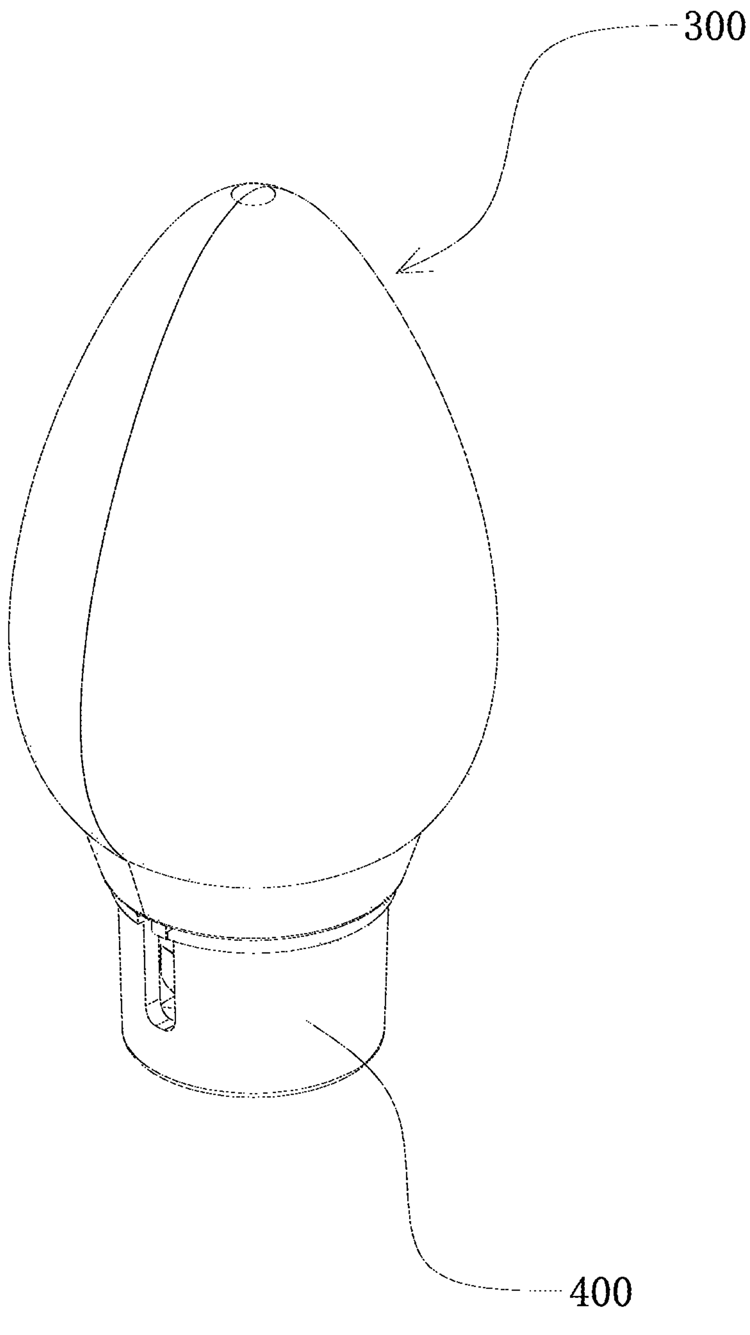
FIG. 3 is a schematic structural diagram of the light bulb according to the present invention.
Figure 11:
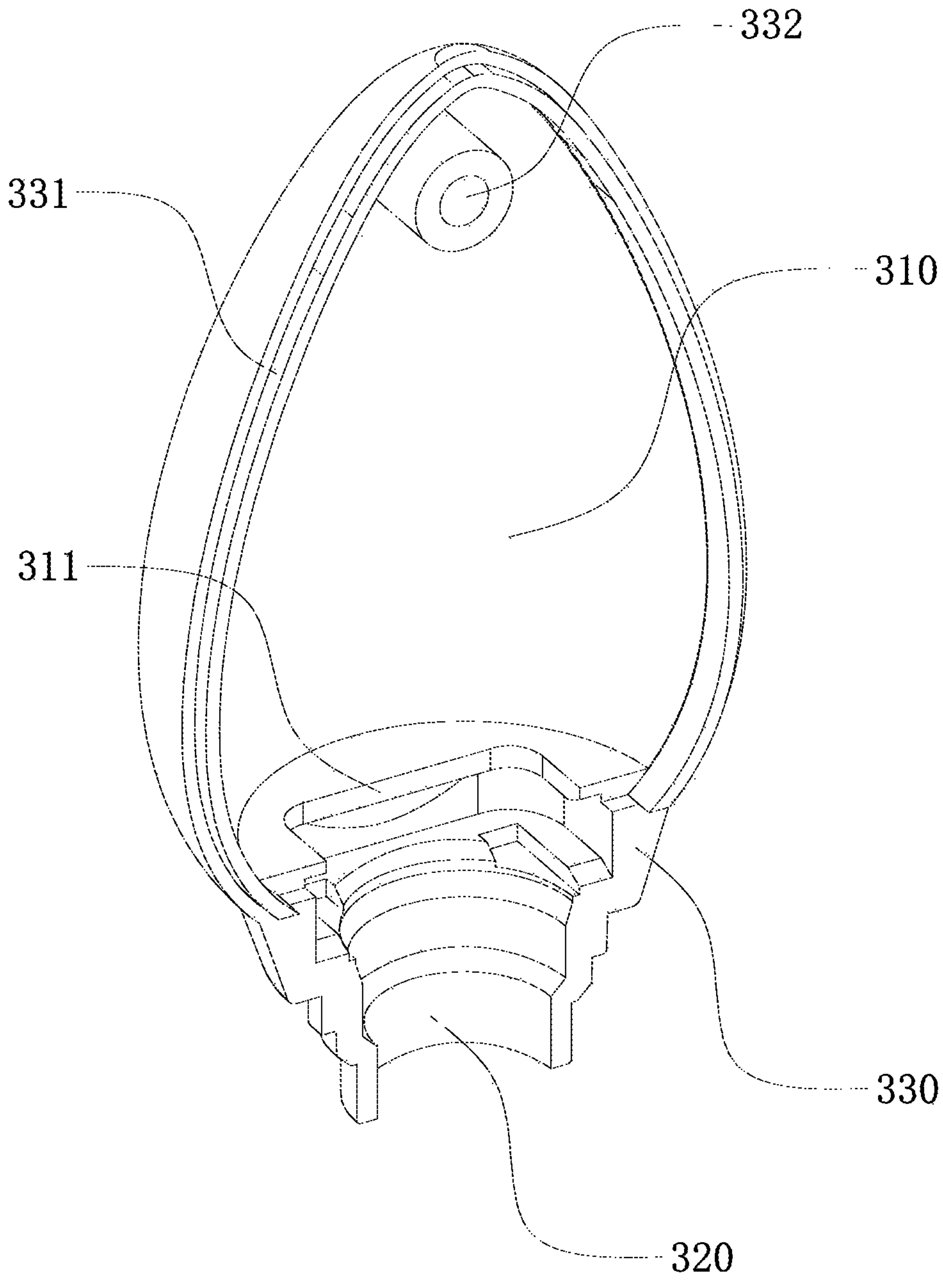
FIG. 11 is a schematic structural diagram of a first shell according to the present invention.
Figure 12:
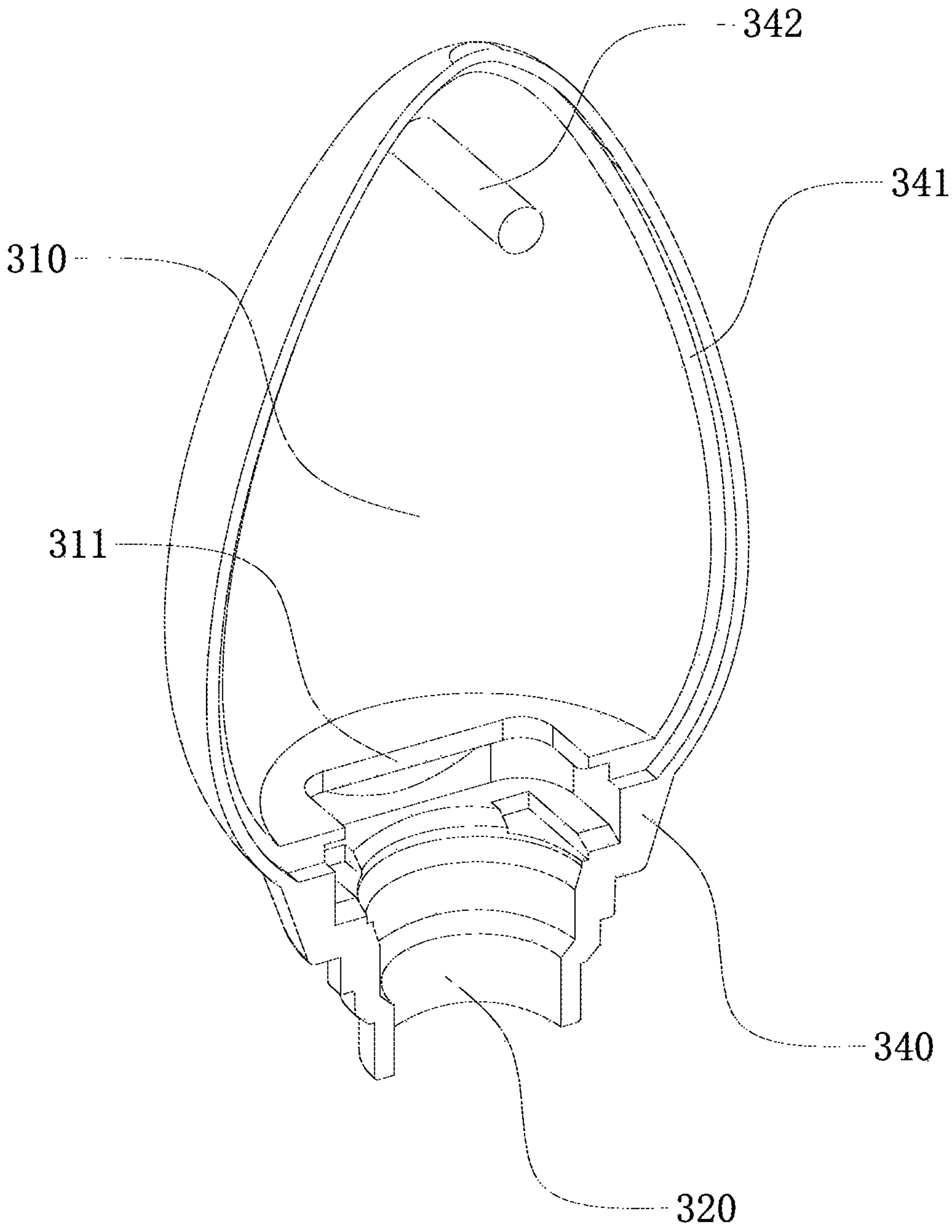
FIG. 12 is a schematic structural diagram of a second shell according to the present invention.

As shown in FIGS. 3, 11 and 12, on the basis of the above embodiment, a housing 300 is further included. The housing 300 has a receiving cavity 310 and a wiring port 320. The wiring port 320 is connected to the receiving cavity 310. Both the circuit board 100 and the fixing member are both arranged in the receiving cavity 310. The light emitted by the light-emitting element passes through the housing 300.

In this embodiment, the housing 300 can cover the circuit board 100 and the fixing member, and the light emitted by the light-emitting element can pass through the housing 300.

As shown in FIGS. 11 and 12, on the basis of the above embodiment, the housing 300 includes a first shell 330 and a second shell 340, and the first shell 330 is detachably connected to the second shell 340 and is assembled with the second shell 340 to form the housing 300.

In this embodiment, the first shell 330 and the second shell 340 are both semi-closed shell structures, the first shell 330 is detachably connected to the second shell 340 and is assembled with the second shell 340 to form the housing 300. The receiving cavity 310 is formed in the housing 300.

As shown in FIGS. 11 and 12, on the basis of the above embodiment, the first shell 330 is provided with a protruding portion 331, and the second shell 340 is provided with a recessed portion 341 adapted to the protruding portion 331. The first shell 330 and the second shell 340 are engaged with the recessed portion 341 through the protruding portion 331.

In the present embodiment, an inner edge of the first shell 330 protrudes outward to form the protruding portion 331, an inner edge of the second shell 340 is recessed inward to form the recessed portion 341, and the first shell 330 and the second shell 340 are engaged with the recessed portion 341 through the protruding portion 331.

As shown in FIGS. 11 and 12, on the basis of the above embodiment, the first shell 330 is further provided with a positioning hole 332, and the second shell 340 is further provided with a positioning pin 342 adapted to the positioning hole 332, and through the positioning hole 332, the first shell 330 can guide the positioning pin 342 of the second shell 340 to move.

In this embodiment, through the positioning hole 332, the first shell 330 can guide the positioning pin 342 of the second shell 340 to move. Based on a better positioning effect, two positioning holes 332 and two positioning pins 342 can be provided. The two positioning holes 332 and the two positioning pins 342 that are arranged correspondingly can limit the rotation of the first shell 330 relative to the second shell 340.

As shown in FIGS. 11 and 12, on the basis of the above embodiment, the receiving cavity 310 is provided with a limiting stand 311, and the circuit board 100 and the fixing member are limited in the limiting stand 311 and are exposed out of the light-emitting unit 110.

In this embodiment, the limiting stand 311 is actually a plate-like structure formed by the inner wall of the housing 300 protruding inward. The circuit board 100 and the fixing member are limited in the limiting stand 311 and are exposed out of the light-emitting unit 110.

Figure 15:
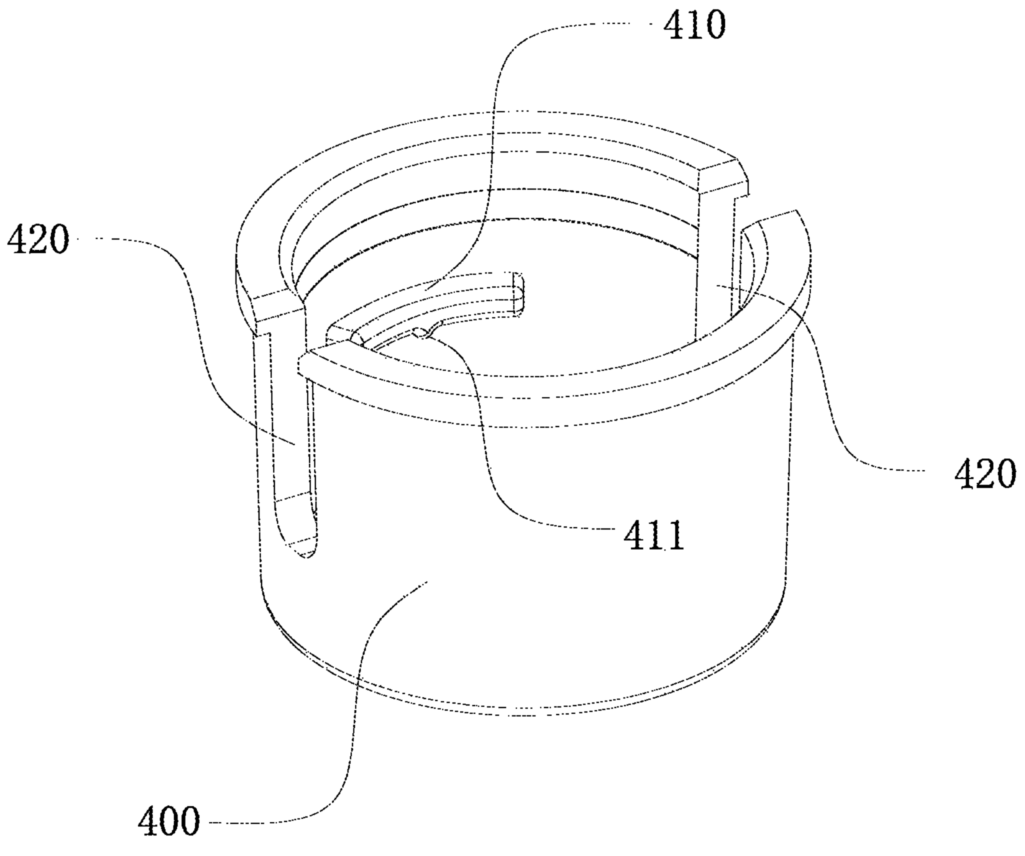
FIG. 15 is a schematic structural diagram of a wiring block according to the present invention.
Figure 16:
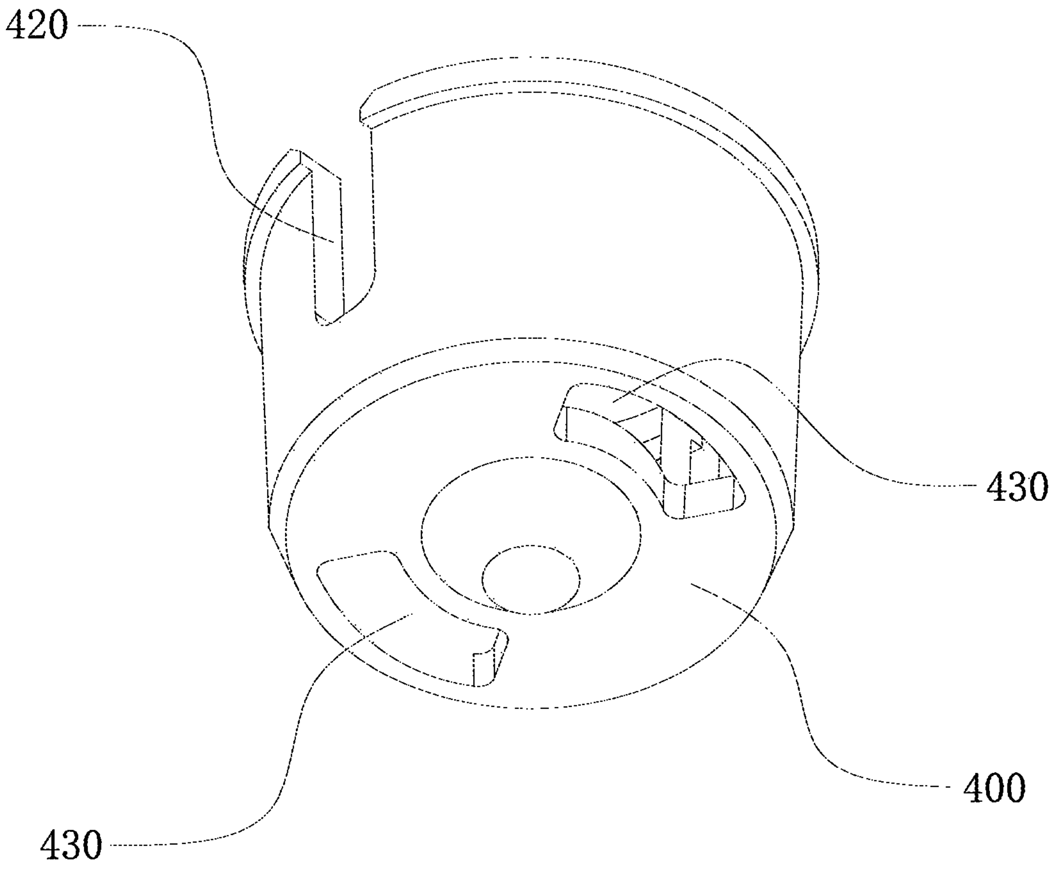
FIG. 16 is a schematic structural diagram of the wiring block according to the present invention from another perspective.

As shown in FIGS. 15 and 16, on the basis of the above embodiment, a wiring block 400 is further included. The wiring block 400 is detachably connected to the housing 300. When the wiring block 400 is connected to the housing 300, the wiring port 320 is covered.

In this embodiment, the wiring block 400 is detachably connected to the housing 300. When the wiring block 400 is connected to the housing 300, the wiring port 320 is covered, thereby preventing the wire from falling out of the wiring port 320.

Figure 13:
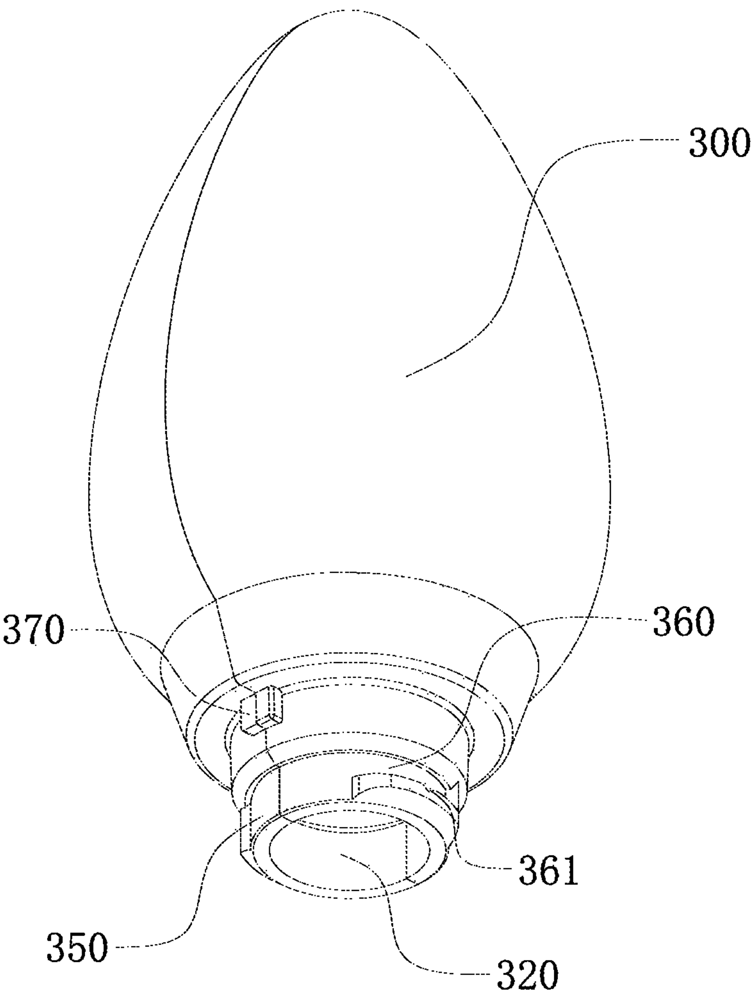
FIG. 13 is a schematic structural diagram of a housing according to the present invention.

As shown in FIGS. 13, 15 and 16, on the basis of the above embodiment, the end of the housing 300, which is of a cylindrical structure, is provided with unlocking grooves 350 in its axial direction and locking grooves 360 in its circumferential direction. The unlocking groove 350 and the locking groove 360 communicate with each other. The wiring block 400 is provided with connecting blocks 410. The connecting blocks 410 can move axially along the unlocking grooves 350 at the end of the housing 300 and can move circumferentially along the locking grooves 360 at the end of the housing 300. When located in the locking grooves 360, the connecting blocks 410 are limited by the locking grooves 360 to move axially at the end of the housing 300.

Specifically, the unlocking grooves 350 formed in the axial direction of the end of the housing 300 are connected to the locking grooves 360 formed in the circumferential direction of the end of the housing 300 to form L-shaped groove structures.

In this embodiment, when located in the locking grooves 360, the connecting blocks 410 are limited by the locking grooves 360 to move axially at the end of the housing 300, so the connecting blocks 410 are first slid to the unlocking grooves 350 and then to the locking grooves 360. In this way, the wiring stand 400 can be prevented from falling off from the housing 300 automatically.

As shown in FIGS. 13, 15 and 16, on the basis of the above embodiment, each locking groove 360 is provided with a snap-on recess 361, and each connecting block 410 is provided with a snap-on protrusion 411. When the connecting blocks 410 move along the locking grooves 360 and the snap-on protrusions 411 are aligned with the snap-on recesses 361, the connecting blocks 410 are engaged with the snap-on recesses 361 of the locking grooves 360 through the snap-on protrusions 411.

In this embodiment, when the connecting blocks 410 move along the locking grooves 360 and the snap-on protrusions 411 are aligned with the snap-on recesses 361, the connecting blocks 410 are engaged with the snap-on recesses 361 of the locking grooves 360 through the snap-on protrusions 411, thereby preventing the connecting blocks 410 from sliding arbitrarily in the locking grooves 360.

Preferably, two unlocking grooves 350, two locking grooves 360 and two connecting blocks 410 are provided. The two unlocking grooves 350 are arranged symmetrically, the two locking grooves 360 are arranged symmetrically, and the two connecting blocks 410 are arranged symmetrically.

Figure 14:
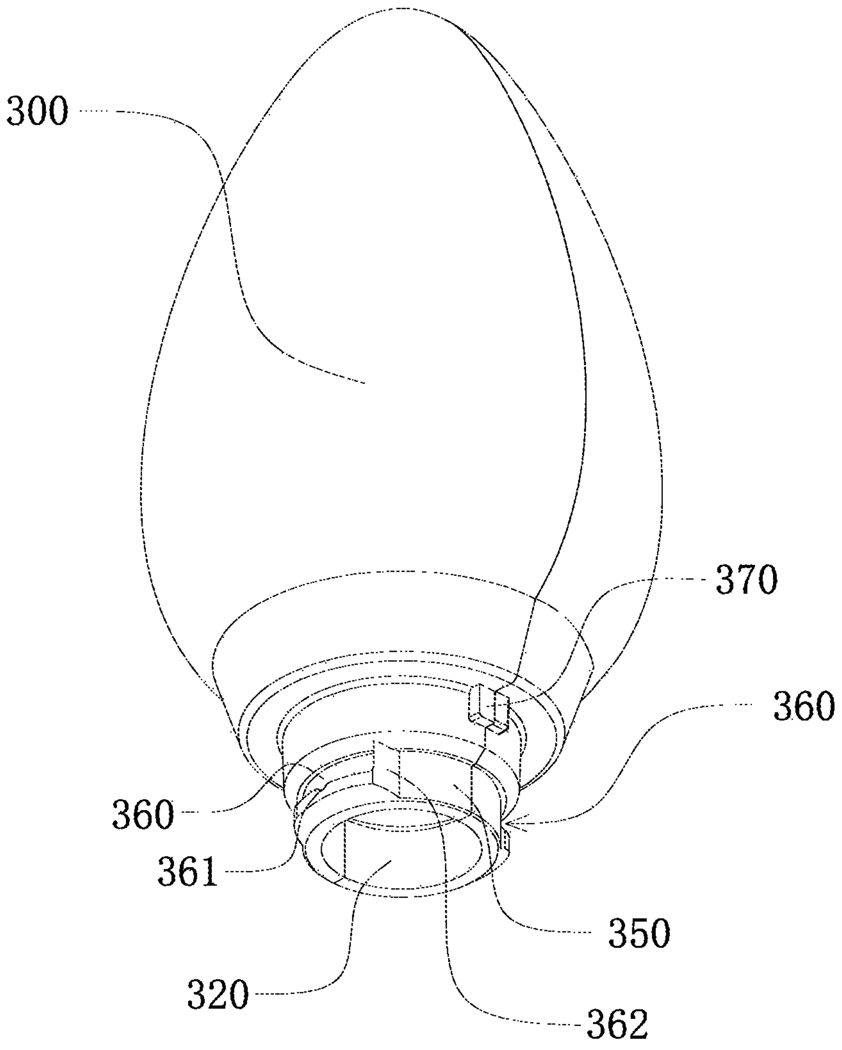
FIG. 14 is a schematic structural diagram of the housing according to the present invention from another perspective.

As shown in FIGS. 14, 15 and 16, on the basis of the above embodiment, the wiring block 400 is provided with positioning grooves 420. The side wall of each locking groove 360 is provided with a one-way slope 362. One connecting block 410 can move from the unlocking groove 350 to the adjacent locking groove 360 through the one-way slope 362.

In this embodiment, one connecting block 410 can move from the unlocking groove 350 to the adjacent locking groove 360 through the one-way slope 362, so even if the user rotates the connecting block in a wrong direction, the connecting block 410 can still fall into the adjacent unlocking groove 350 rather than being blocked from rotating, and the wiring block 400 can be used more flexibly.

Figure 2:
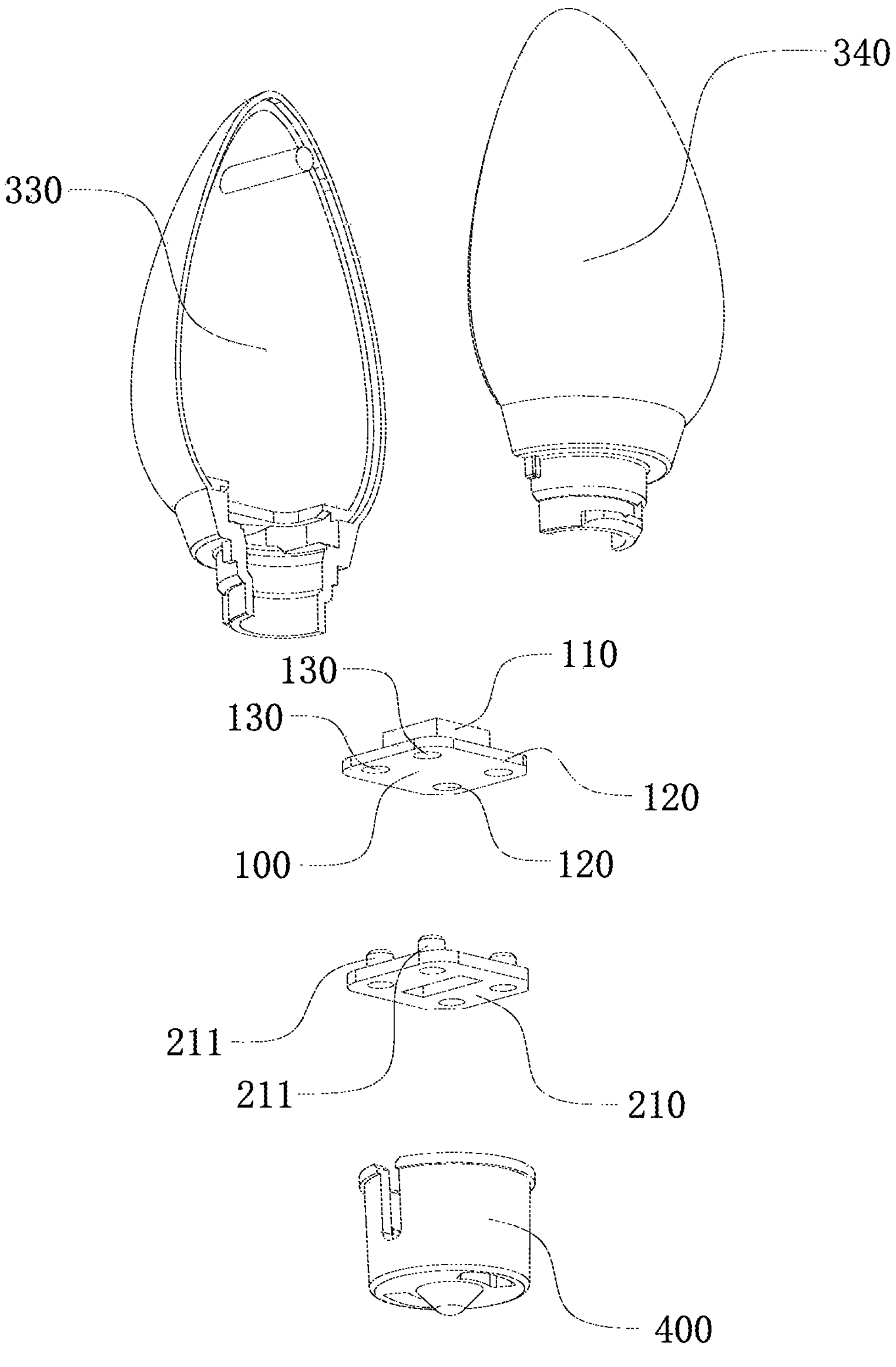
FIG. 2 is an exploded view of the light bulb according to the present invention from another perspective.

As shown in FIGS. 1, 2 and 3, on the basis of the above embodiment, the wiring block 400 is provided with positioning grooves 420, and the housing 300 is provided with positioning blocks 370. When the connecting block 410 move along the locking grooves 360 and the positioning blocks 370 are aligned with the positioning grooves 420, the housing 300 can be engaged with the positioning grooves 420 of the wiring block 400 through the positioning blocks 370.

In this embodiment, when the connecting blocks 410 move along the locking grooves 360 and the positioning blocks 370 are aligned with the positioning grooves 420, the housing 300 can be engaged with the positioning grooves 420 of the wiring block 400 through the positioning blocks 370, so that the housing 300 can better fix the wiring block 400.

Preferably, two positioning grooves 420 and two positioning blocks 370 are provided. The two positioning grooves 420 are arranged symmetrically, and the two positioning blocks 370 are arranged symmetrically.

In fact, the two positioning grooves 420 evenly divide the wiring block 400 into two elastic blocks that can be stretched outward. Therefore, when the positioning blocks 370 are not in the positioning grooves 420, the positioning blocks 370 push and stretch the two elastic blocks outward. When the positioning blocks 370 are in the positioning grooves 420, the elastic blocks are automatically reset to complete the locking.

As shown in FIGS. 1, 2 and 3, on the basis of the above embodiment, the wiring block 400 is provided with a line distribution hole 430.

In this embodiment, the line distribution hole 430 allows customers to distinguish the wires that need to be connected. Generally speaking, an even number of second wiring parts 130 are provided, and the number of line distribution holes 430 can be set to be half of the sum of the number of wiring parts 120 and the number of second wiring parts 130.

As shown in FIGS. 1 to 16, further provided is a light strip, including the light bulb and further including a power supply, wherein at least one light bulb is provided, the light bulbs are electrically connected in sequence, the two first wiring parts 120 of one of the light bulbs are connected to positive and negative poles of the power supply, and the two first wiring parts 120 of the next light bulb are respectively electrically connected to the two second wiring parts 130 of the former light bulb.

In this embodiment, users can connect the light bulbs in sequence as needed to form a complete light strip, and the light bulbs can be disassembled and replaced at any time. The light strip can be lengthened by connecting the bulbs in sequence through wires.

What is claimed is:

1. A light bulb, comprising:

a circuit board provided with a light-emitting unit, two first wiring parts and at least two second wiring parts, wherein one of the first wiring parts and one of the second wiring parts are both connected to a positive terminal of the light-emitting unit, and the other first wiring part and the other second wiring part are both connected to a negative terminal of the light-emitting unit; and a fixing member connected to the circuit board, the fixing member being capable of fixing wires to the first wiring parts and the second wiring parts;

wherein the fixing member is configured as a fixing plate, the fixing plate is detachably connected to the circuit board, the fixing plate is provided with wiring terminals, the number of wiring terminals is the same as the sum of the number of first wiring parts and the number of second wiring parts, and the wiring terminals are in one-to-one correspondence with the first wiring parts and the second wiring parts; when the fixing plate is connected to the circuit board, the wiring terminals crimp the wires on the first wiring parts and the second wiring parts.

2. The light bulb according to claim 1, wherein the first wiring parts and the second wiring parts are configured as guide holes, and the wiring terminals are slidably connected to the guide holes.

3. The light bulb according to claim 2, wherein each wiring terminal is provided with a threading hole and the wiring terminals are arranged on a front side of the fixing plate, and the wires extend from a back side of the fixing plate through the threading holes to the front side of the fixing plate.

4. The light bulb according to claim 1, wherein the fixing member is configured as elastic sheets, ends of the elastic sheets are fixedly connected to the circuit board, the number of elastic sheets is the same as the sum of the number of first wiring parts and the number of second wiring parts, and the elastic sheets are in one-to-one correspondence with the first wiring parts and the second wiring parts; the elastic sheets crimp the wires on the first wiring parts and the second wiring parts.

5. The light bulb according to claim 1, wherein the fixing member is configured as a clip, and the clip is detachably connected to the circuit board; when connected to the circuit board, the clip crimps the wires on the first wiring parts and/or the second wiring parts.

6. The light bulb according to claim 1, further comprising a housing, wherein the housing has a receiving cavity and a wiring port, the wiring port is connected to the receiving cavity, both the circuit board and the fixing member are arranged in the receiving cavity, and light emitted by the light-emitting element passes through the housing.

7. The light bulb according to claim 6, wherein the housing comprises a first shell and a second shell, and the first shell is detachably connected to the second shell and is assembled with the second shell to form the housing.

8. The light bulb according to claim 7, wherein the first shell is provided with a protruding portion, the second shell is provided with a recessed portion adapted to the protruding portion, and the first shell and the second shell are engaged through the protruding portion and the recessed portion.

9. The light bulb according to claim 8, wherein the first shell is further provided with a positioning hole, the second shell is further provided with a positioning pin adapted to the positioning hole, and through the positioning hole, the first shell is able to guide the positioning pin of the second shell to move.

10. The light bulb according to claim 6, wherein the receiving cavity is provided with a limiting stand, and the circuit board and the fixing member are limited in the limiting stand and are exposed out of the light-emitting unit.

11. The light bulb according to claim 6, further comprising a wiring block, the wiring block being detachably connected to the housing, the wiring port being covered when the wiring block is connected to the housing.

12. The light bulb according to claim 11, wherein an end of the housing, which is of a cylindrical structure, is provided with unlocking grooves in its axial direction and locking grooves in its circumferential direction; the unlocking grooves are communicated with the locking grooves; the wiring block is provided with connecting blocks; the connecting blocks are able to move axially along the unlocking grooves at the end of the housing and are able to move circumferentially along the locking grooves at the end of the housing; when located in the locking grooves, the connecting blocks are limited by the locking grooves to move axially at the end of the housing.

13. The light bulb according to claim 12, wherein each locking groove is provided with a snap-on recess, and each connecting block is provided with a snap-on protrusion; when the connecting blocks move along the locking grooves and the snap-on protrusions are aligned with the snap-on recesses, the connecting blocks are engaged with the snap-on recesses of the locking grooves through the snap-on protrusions.

14. The light bulb according to claim 13, wherein a side wall of each locking groove is provided with a one-way slope, and the connecting blocks are able to move from the unlocking grooves to the adjacent locking grooves through the one-way slopes.

15. The light bulb according to claim 11, wherein the wiring block is provided with a line distribution hole.

16. The light bulb according to claim 12, wherein two unlocking grooves, two locking grooves and two connecting blocks are provided; the two unlocking grooves are arranged symmetrically, the two locking grooves are arranged symmetrically, and the two connecting blocks are arranged symmetrically.

17. The light bulb according to claim 12, wherein the wiring block is provided with positioning grooves, and the housing is provided with positioning blocks; when the connecting blocks move along the locking grooves and the positioning blocks are aligned with the positioning grooves, the housing is engaged with the positioning grooves of the wiring block through the positioning blocks.

18. The light bulb according to claim 17, wherein two positioning grooves and two positioning blocks are provided; the two positioning grooves are arranged symmetrically, and the two positioning blocks are arranged symmetrically.

19. A light strip, comprising the light bulb according to claim 1 and further comprising a power supply, wherein at least one light bulb is provided, the light bulbs are electrically connected in sequence, the two first wiring parts of one of the light bulbs are connected to positive and negative poles of the power supply, and the two first wiring parts of the next light bulb are respectively electrically connected to the two second wiring parts of the former light bulb.

* * * * *